US011876325B2

(12) United States Patent
Chang et al.

(10) Patent No.: US 11,876,325 B2
(45) Date of Patent: Jan. 16, 2024

(54) ELECTRICAL CONNECTOR WITH LOCKING COMPONENT

(71) Applicant: JESS-LINK PRODUCTS CO., LTD., New Taipei (TW)

(72) Inventors: Hsu-Feng Chang, New Taipei (TW); Lin Huang, New Taipei (TW)

(73) Assignee: JESS-LINK PRODUCTS CO., LTD., New Taipei (TW)

( * ) Notice: Subject to any disclaimer, the term of this patent is extended or adjusted under 35 U.S.C. 154(b) by 84 days.

(21) Appl. No.: 17/575,374

(22) Filed: Jan. 13, 2022

(65) Prior Publication Data

US 2022/0231458 A1 Jul. 21, 2022

(30) Foreign Application Priority Data

Jan. 19, 2021 (TW) ................................ 110101996

(51) Int. Cl.
*H01R 13/639* (2006.01)
*H01R 24/40* (2011.01)
*H01R 13/05* (2006.01)
*H01R 13/11* (2006.01)

(52) U.S. Cl.
CPC ......... *H01R 13/639* (2013.01); *H01R 13/052* (2013.01); *H01R 13/111* (2013.01); *H01R 24/40* (2013.01)

(58) Field of Classification Search
CPC ........................... H01R 13/639; H01R 13/052
See application file for complete search history.

(56) References Cited

U.S. PATENT DOCUMENTS 1,727,347 A * 9/1929 Knickerbocker ...... H01R 13/70 200/50.28
3,602,009 A * 8/1971 Powell ...................... F16C 1/08 464/57
3,760,332 A * 9/1973 Berkovits ............ A61N 1/3752 439/948
4,034,172 A * 7/1977 Glover ................. H01R 13/703 439/372
4,146,682 A * 3/1979 Nakao ................. H01M 50/213 439/352

(Continued)

FOREIGN PATENT DOCUMENTS

CN 110429412 A 11/2019
CN 210806195 U 6/2020

(Continued)

*Primary Examiner* — Neil Abrams

(57) ABSTRACT

An electrical connector includes a socket, a plug and a locking component. The socket includes a socket case having a fixing groove disposed at the outer surface and a socket terminal configured in the socket case. The plug includes a plug case having a locking hole, a containing space configured for containing the socket case and a plug terminal configured in the containing space. The locking component is disposed in the locking hole and configured to move in the locking hole. When the plug is connected to the socket, the socket terminal embeds into the plug terminal, so that the socket case is located between the plug case and the plug terminal and the fixing groove is corresponding to the locking hole. Then, the locking component moves toward the plug terminal and engages to the fixing groove to lock the plug and the socket.

9 Claims, 6 Drawing Sheets

(56) References Cited

U.S. PATENT DOCUMENTS 4,227,762 A * 10/1980 Scheiner .............. H01R 13/627 439/368
4,302,066 A * 11/1981 Newman ............ H01R 13/6395 439/347
4,355,862 A * 10/1982 Kock ................... G02B 6/3855 385/81
4,590,540 A * 5/1986 Nicholson ............ H01R 13/639 70/345
4,774,399 A * 9/1988 Fujita ................... G06K 7/0047 235/441
4,774,645 A * 9/1988 Iwamoto ............... F21S 41/198 362/519
4,863,201 A * 9/1989 Carstens ................. F16L 37/42 285/308
5,011,426 A * 4/1991 Colleran ............ B60G 17/0408 439/357
5,023,610 A * 6/1991 Rubow ................... H03M 7/30 375/240
5,208,116 A * 5/1993 Joh ....................... G06F 1/1616 429/96
5,341,812 A * 8/1994 Allaire ................... H01R 31/06 600/508
5,413,595 A * 5/1995 Stutz, Jr. .............. A61N 1/3752 607/37
5,431,570 A * 7/1995 Gibbs .................. B62D 35/007 29/854
5,460,549 A * 10/1995 Muzslay .............. H01R 13/521 439/733.1
5,603,630 A * 2/1997 Villain ................. H01Q 1/1214 439/352
5,748,821 A * 5/1998 Schempp ............. G02B 6/3879 385/59
6,089,897 A * 7/2000 Boussairy ............ H01R 13/635 439/157
8,092,241 B2 * 1/2012 Chang ..................... H01R 13/70 439/38
9,819,099 B2 * 11/2017 Finona ................. H01R 43/048
10,320,100 B2 * 6/2019 Phillips .............. H01R 12/7029
10,975,982 B2 * 4/2021 Wilhelm ............... F16K 35/025
11,384,785 B2 * 7/2022 Schlegel ............... F16B 21/165
11,493,073 B2 * 11/2022 Schlegel .............. H01R 13/508
11,550,277 B2 * 1/2023 Lovegrove ............ H04L 67/125
2007/0009362 A1 * 1/2007 Tseng ..................... F04D 25/088 416/210 R
2011/0067225 A1 * 3/2011 Bassaco .................. F16L 37/08 285/82
2011/0177711 A1 * 7/2011 Park ....................... A45D 20/12 439/347
2022/0231458 A1 * 7/2022 Chang .................. H01R 13/639

FOREIGN PATENT DOCUMENTS

CN 112038837 A 12/2020
TW M612275 U 5/2021

* cited by examiner

ELECTRICAL CONNECTOR WITH LOCKING COMPONENT

BACKGROUND OF THE INVENTION

1. Field of the Invention

The present invention relates to an electrical connector, and more particularly, to an electrical connector that can prevent the plug and the socket from separating by a locking component.

2. Description of the Prior Art

Connectors are connecting components and accessories for electrical signals, and the electronic devices translate and transmit the signal to each other through cables and connectors. That is to say, the connectors are the communicating bridges for the signals. The connectors are widely applied to cars and computer peripheral and communicating data applications, industries, military and aerospace industry, transportation, consumer electronics, medical treatments, instruments, commercial equipment and so on. Therefore, the connectors play an important role in many fields.

Radio frequency coaxial connectors (PAL connectors) are one of the common types of electrical connectors and applied for electronic control modules (MCU), motors, batteries, vehicle chargers, etc. The PAL connector is also applied for the equipment of energy storage power stations. Since the energy storage cabinet of the energy storage power station has a better volume utilization rate, the electrical connector has been more widely used in the energy storage cabinet. The main components configured in the energy storage cabinet are power electronic devices such as batteries, inverters, and cables. In general, the batteries of the energy storage cabinet need to be grouped into a battery module, and multiple battery modules are combined by electrical connectors to form an energy storage system. However, in the period when the signal transmission speed continues to develop towards high speed, people have more requirements on the volume and energy density of the energy storage cabinet. Therefore, the requirement for electrical connectors connecting each battery module is constantly increasing.

The electrical connector usually includes a plug and a socket matching with the plug, and the plug and the socket are engaged to each other to realize the electrical connection of the electronic products. In the connection of the PAL connector, the case and the pin of the socket are clamped in the case of the plug, and then the plug is connected and fixed to the socket. However, the general PAL connector does not have a reliable locking device. When the connected PAL connector is pulled, twisted or vibrated to a certain extent, the plug may be separated from the socket to make the electrical connector fail to operate, thereby reducing the efficiency of the electrical connector. If the connector plug touches other components to generate a short circuit, the electrical connector may generate sparks, thereby reducing the safety of the device.

Therefore, it is necessary to provide an electrical connector to prevent the plug and the socket from falling off, so as to improve the safety and efficiency of the electrical connector.

SUMMARY OF THE INVENTION

Therefore, the present invention provides an electrical connector applied for a power storage device. The electrical connector includes a socket, a plug and a locking component. The socket includes a socket case and a socket terminal. The outer surface of the socket case has a fixing groove, and the socket terminal is disposed in the socket case. The plug is matched to the socket and configured to connect to the socket, and the plug includes a plug case and a plug terminal. The plug case has a containing space and a locking hole communicated with the containing space, and the containing space is configured to contain the plug case of the plug. The plug terminal includes a first plug terminal and a second plug terminal. The first plug terminal has an axis and configured in the containing space, and the second plug terminal is vertically coupled to the first plug terminal. The locking component is disposed in the locking hole of the plug case and configured to move in the locking hole. When the plug is connected to the socket, the socket terminal embeds into the first plug terminal along the axis direction, so that the socket case is located between the plug case and the first plug terminal and the fixing groove is corresponding to the locking hole. Then, the locking component moves perpendicularly to the axis direction and engages to the fixing groove of the socket to fix the plug and socket.

Wherein, the plug case has a sleeve structure disposed in the containing space and sleeved the first plug terminal. When the plug is connected to the socket, the socket case is located between the plug case and the sleeve structure.

Furthermore, the plug includes a back cover connected to the plug case and perpendicular to the first plug terminal. The second plug terminal is configured in the back cover.

Wherein, the first plug terminal and the second plug terminal are integrally formed.

In one embodiment, the first plug terminal includes a protruding structure, and the second plug terminal includes a hole. The size of the protruding structure is greater than that of the hole, and the protruding structure is riveted to the hole.

Wherein, the plug includes a contacting terminal with cylindrical shape. The contacting terminal is disposed in the first plug terminal and contacts the first plug terminal. When the socket is connected to the plug, the socket terminal of the socket contacts the contacting terminal to electrically connect to the first plug terminal.

Moreover, the contacting terminal has two fixed ends and an elastic portion located between the two ends. When the socket is connected to the plug, the elastic portion resists the socket terminal of the socket with an elastic force.

Wherein, the locking component has a locking structure, and the wall of the locking hole has a first locking groove and a second locking groove corresponding to the locking structure and arranged along the direction perpendicular to the axis. The second locking groove is located on a side adjacent to the first plug terminal. When the locking structure is located in the second locking groove, the locking component is locked in the fixing groove of the socket.

Wherein, the extending direction of the locking hole and the axis direction of the first plug terminal are perpendicular to each other.

Wherein, the shape of the locking component is corresponding to the shape of the fixing groove of the socket.

In summary, the electrical connector of the present invention can fix the socket and the plug in a moving manner perpendicular to the connection direction of the socket and the plug by the locking component, so as to improve the safety and efficiency of the electrical connector. Moreover, the electrical connector of the present invention can prevent the plug terminal from deforming due to compression during installation via the sleeve structure of the socket case, thereby improving the installation efficiency. Furthermore, the electrical connector of the present invention can clamp the socket terminal of the socket by the contacting terminal to improve the stability. In addition, the electrical connector of the present invention can produce plug terminals in different process methods to save costs and improve stability.

BRIEF DESCRIPTION OF THE APPENDED DRAWINGS

DETAILED DESCRIPTION OF THE INVENTION

Figure 1:
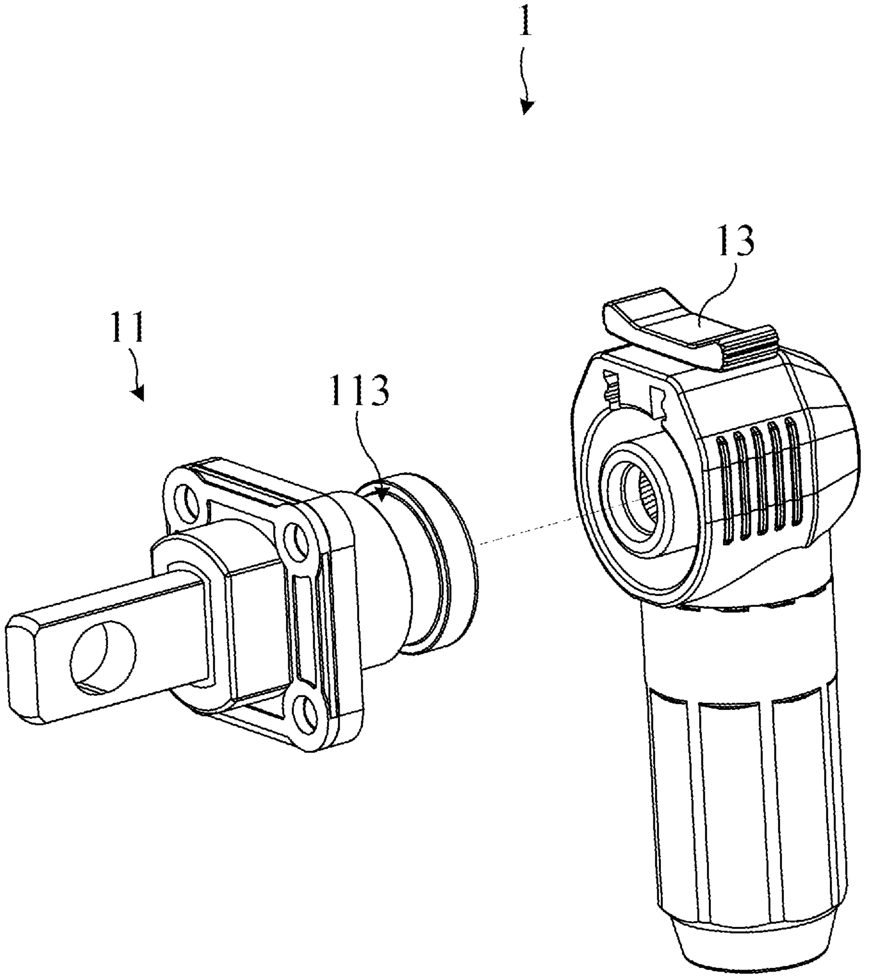
FIG. 1 is a structure schematic diagram illustrating an electrical connector according to an embodiment of the present invention.

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments. Moreover, the devices in the figures are only used to express their corresponding positions and are not drawing according to their actual proportion.

In the description of this specification, the description with reference to the terms "a specific embodiment", "another specific embodiment" or "parts of specific embodiments" etc. means that the specific feature, structure, material or feature described in conjunction with the embodiment include in at least one embodiment of the present invention. In this specification, the schematic representations of the above-mentioned terms do not necessarily refer to the same embodiment. Moreover, the described specific features, structures, materials or characteristics can be combined in any one or more embodiments in a suitable manner.

In the description of the present invention, it is to be understood that the orientations or positional relationships of the terms "longitudinal, lateral, upper, lower, front, rear, left, right, top, bottom, inner, outer" and the like are based on the orientation or positional relationship shown in the drawings. It is merely for the convenience of the description of the present invention and the description of the present invention, and is not intended to indicate or imply that the device or component referred to has a specific orientation, is constructed and operated in a specific orientation, and therefore cannot be understood as limitations of the invention.

Figure 2:
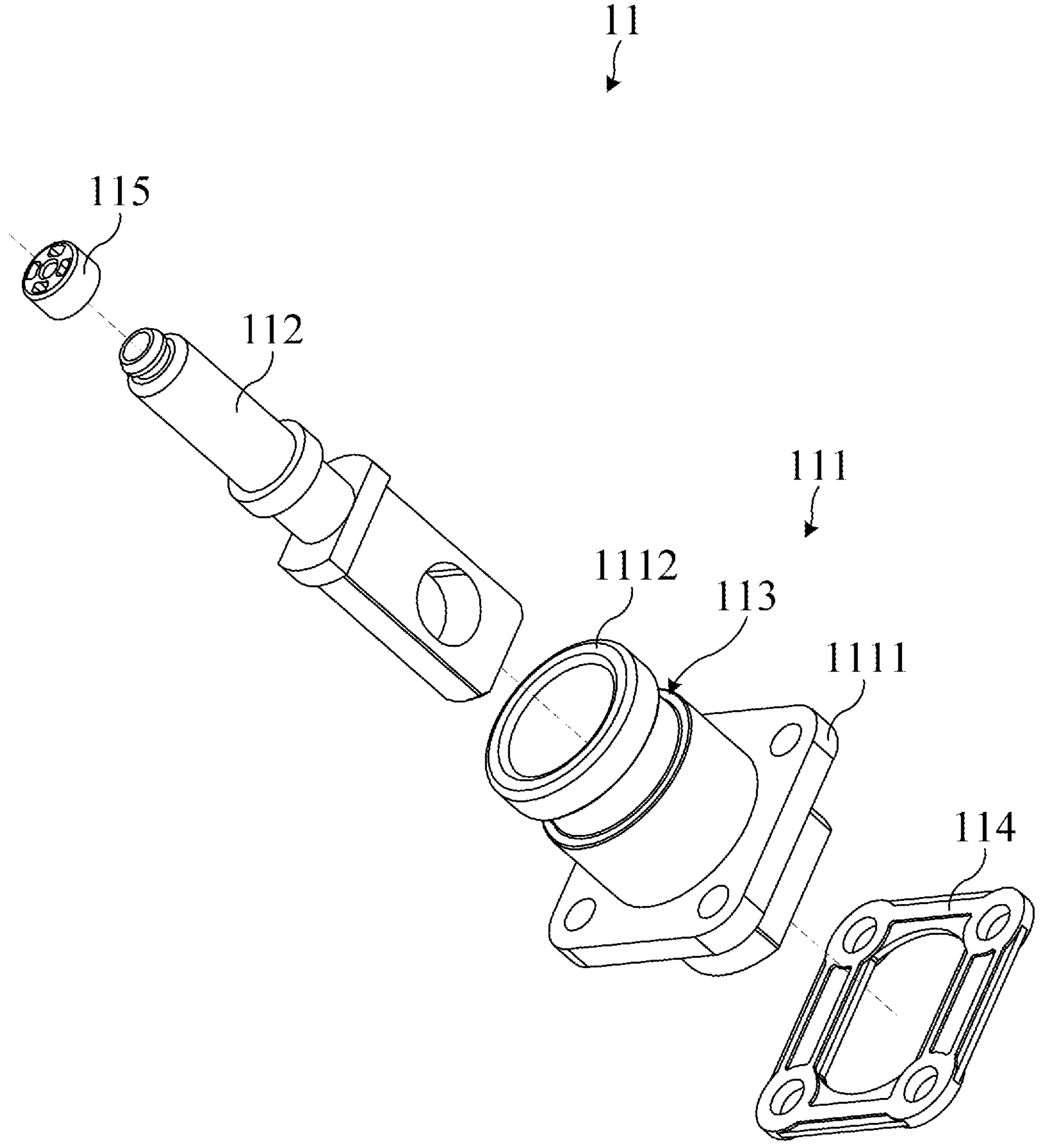
FIG. 2 is an exploded diagram illustrating the socket in FIG. 1.
Figure 3:
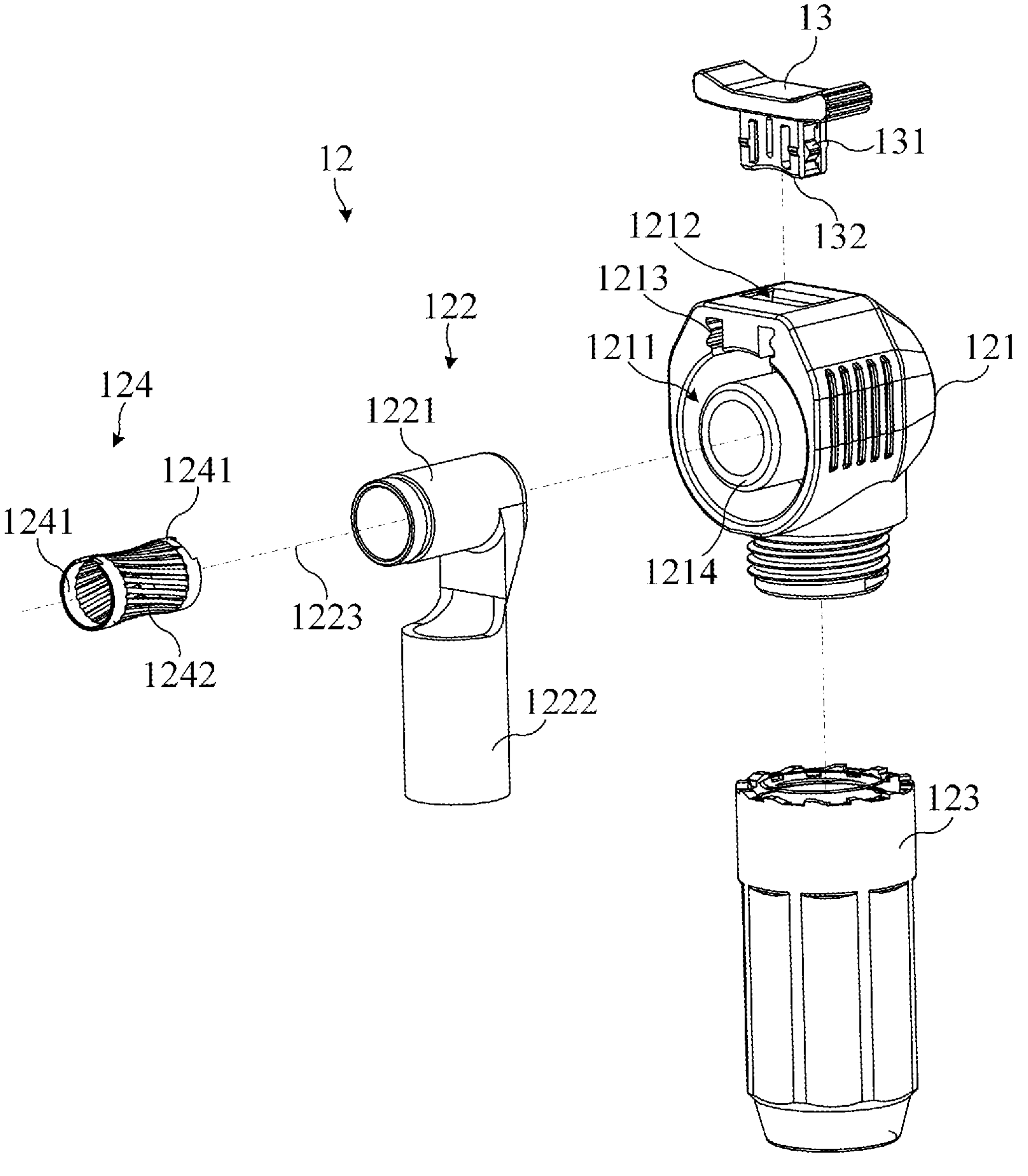
FIG. 3 is an exploded diagram illustrating the plug and the locking component in FIG. 1.

Please refer to FIG. 1, FIG. 2 and FIG. 3. FIG. 1 is a structure schematic diagram illustrating an electrical connector 1 according to an embodiment of the present invention. FIG. 2 is an exploded diagram illustrating the socket 11 in FIG. 1. FIG. 3 is an exploded diagram illustrating the plug 12 and the locking component 13 in FIG. 1. As shown from FIG. 1 to FIG. 3, the electrical connector 1 of the present invention includes a socket 11, a plug 12 and a locking component 13. The socket 11 includes a socket case 111 and a socket terminal 112. The outer surface of the socket case 111 has a fixing groove 113, and the socket terminal 112 is configured in the socket case 111. The plug 12 is matched to the socket 11 and configured to connect to the socket 11. The plug 12 includes a plug case 121 and a plug terminal 122. The plug case 121 has a containing space 1211 and a locking hole 1212 communicated with the containing space 1211, and the plug terminal 122 is disposed in the containing space 1211. The locking component 13 is disposed in the locking hole 1212 of the plug case 121 and configured to move in the locking hole 1212.

In this embodiment, the socket case 111 of the socket 11 includes a fixed plate 1111 and a cylindrical structure 1112. The cylindrical structure 1112 extends outward from one side surface of the fixed plate 1111, and the fixed plate 1111 has a through hole (not shown in figure) in the cylindrical structure 1112. The fixing groove 113 is disposed on the outer surface of the cylindrical structure 1112. The socket terminal 112 is approximately cylindrical shape. The socket terminal 112 passes through the through hole of the fixed plate 1111, and one end of the socket terminal 112 is located in the cylindrical structure 1112. In practice, the fixed plate 1111 can be fixed on a component of a device or circuit board. When the plug terminal 122 embeds into the socket case 111, the cylindrical structure 1112 of the socket case 111 and the end of the socket terminal 112 located in the cylindrical structure 1112 are configured to connect to the plug 12, and the other end of the socket terminal is located on the other side of the fixed plate 1111 and can be connected to cables or pads on the circuit board.

In this embodiment, the containing space 1211 of the plug case 121 is approximately cylindrical shape, and the containing space 1211 is configured to receive and contain the cylindrical structure 1112 of the socket case 111. Furthermore, the plug case 121 includes a cavity located below the plug case 121, and the cavity is perpendicularly communicated with the containing space 1211. The bottom of the plug case 121 also includes an opening communicated with the cavity. The plug terminal 122 includes a first plug terminal 1221 and a second plug terminal 1222, and the first plug terminal 1221 and the second plug terminal 1222 are cylindrical shape. The first plug terminal 1221 has an axis 1223 and is configured in the containing space 1211, and the second plug terminal 1222 is configured in the cavity. That is to say, the extending directions of the first plug terminal 1221 and the second plug terminal 1222 are perpendicular to each other. In practice, the first plug terminal 1221 and the second plug terminal 1222 of the plug terminal 122 can be integrally formed. When the plug terminal 122 embeds into the plug case 121, part of the second plug terminal 1222 is exposed outside of the opening. The shape of the containing space 1211 of the plug case 121 is corresponding to the shape of the cylindrical structure 1112 of the socket case 111, and the position of the socket terminal 112 configured in the cylindrical structure 1112 is corresponding to the position of the first plug terminal 1221 configured in the containing space 1211. When the socket 11 is connected to the plug 12, the socket case 111 of the socket 11 embeds into the containing space 1211 of the plug 12 along the axis 1223 of the first plug terminal 1221, and the socket terminal 112 embeds into the first plug terminal 1221 along the axis 1223 of the first plug terminal 1221. At this time, the socket case 111 is located between the plug case 121 and the first plug terminal 1221 of the plug 12. The materials of the socket case 111 and the plug case 121 are the insulating materials, and the materials of the socket terminal 112, the first plug terminal 1221 and the second plug terminal 1222 are metal or conductive materials. Therefore, when the socket 11 is connected to the plug 12 and the socket terminal 112 embeds into the first plug terminal 1221, the socket terminal 112 is electrically connected to the first plug terminal 1221.

Moreover, the plug 12 includes a back cover 123 connected to the plug case 121 and sleeved the opening located below the plug case 121. The second plug terminal 1222 is configured in the back cover 123. In practice, the material of the back cover 123 can be an insulating material and connected to the plug case 121 in a locking manner. Furthermore, the back cover 123 can includes a perforation configured for the cable to pass through and connected to the second plug terminal 1222, to prevent the cable and the second plug terminal 1222 from being exposed. When the socket 11 is connected to the plug 12, the cable connected to the second plug terminal 1222 can electrically connect to the device component or circuit board via second plug terminal 1222, the first plug terminal 1221, the contacting terminal 124 and the socket terminal 112 to transmit the data and signals.

Figure 4:
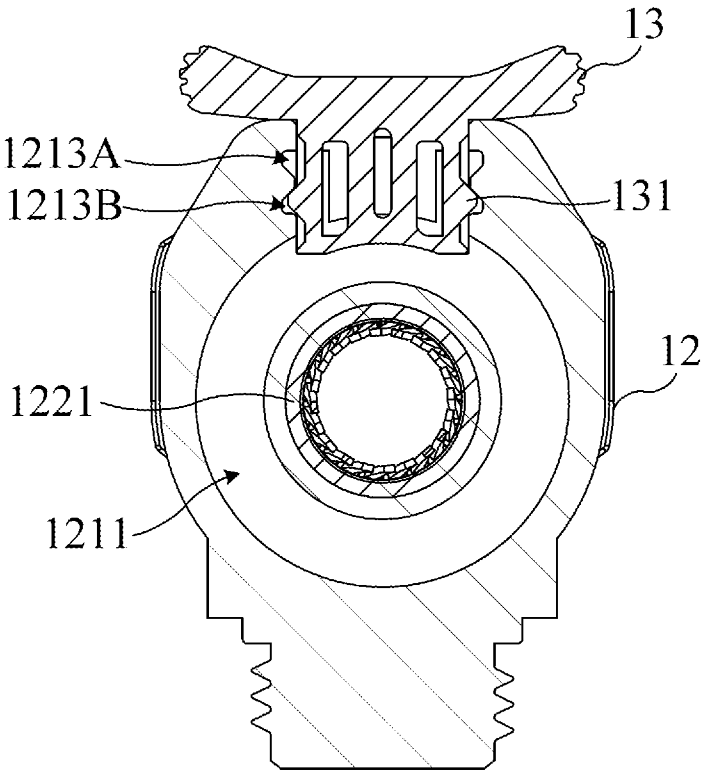
FIG. 4 is a sectional diagram illustrating the plug and the locking component in FIG. 1.

Please refer from FIG. 1 to FIG. 4. FIG. 4 is a sectional diagram illustrating the plug 12 and the locking component 13 in FIG. 1. As shown in FIG. 1, FIG. 3 and FIG. 4, in this embodiment, the locking hole 1212 of the plug case 121 is configured above the first plug terminal 1221. Moreover, the extending direction of the locking hole 1212 is perpendicular to the direction of the axis 1223 of the first plug terminal 1221. Therefore, when the locking component 13 is configured in the locking hole 1212, the locking component 13 can move along the direction perpendicular to the axis 1223 of the first plug terminal 1221 to be close to or away from the containing space 1211 of the plug case 121. In practice, the position of the locking hole 1212 is not limited to the top of the plug case 121, and the locking hole 1212 can also be configured on the side or bottom of the plug case 121.

Moreover, the hole wall 1213 of the locking hole 1212 of the plug case 121 includes a first locking groove 1213A and a second locking groove 1213B. The first locking groove 1213A and the second locking groove 1213B are arranged along the extending direction of the locking hole 1212. That is to say, the first locking groove 1213A and the second locking groove 1213B are arranged along the direction perpendicular to the axis 1223 of the first plug terminal 1221. The second locking groove 1213B is located on the side adjacent to the first plug terminal 1221. Furthermore, the locking component 13 has a locking structure 131, and the shapes of the first locking groove 1213A and the second locking groove 1213B are corresponding to the shape of the locking structure 131. The locking component 13 can be engaged with the first locking groove 1213A or the second locking groove 1213B by the locking structure 131 to move in the locking hole 1212. In practice, the locking structure 131 may be a bump, a trapezoid or a guiding structure. The first locking groove 1213A or the second locking groove 1213B is corresponding to the shape of the locking structure 131. Furthermore, the locking structure 131 may also have elasticity. Therefore, the user can move the locking component 13 by pulling up or pressing down, so that the locking structure 131 of the locking component 13 can be engaged in the first locking groove 1213A or the second locking groove 1213B.

Figure 5:
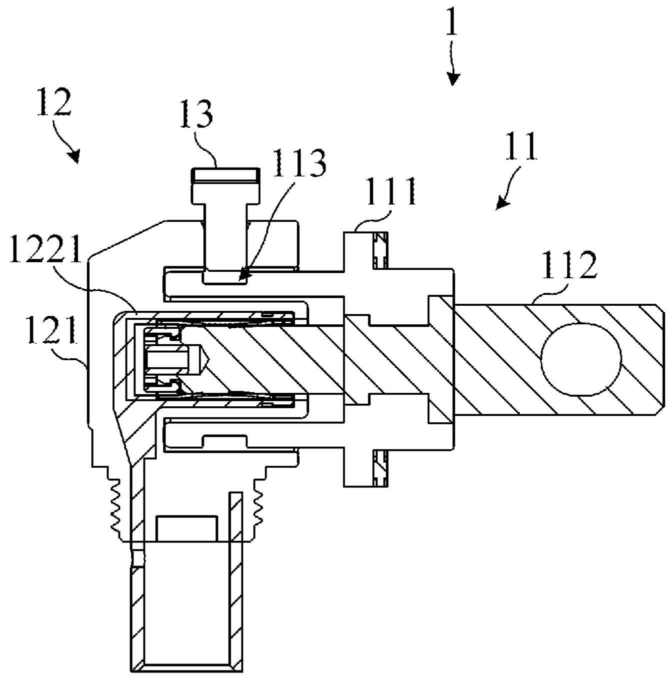
FIG. 5 is a sectional diagram illustrating the locking component of the electrical connector un-engaged to the fixing groove according to an embodiment of the present invention.
Figure 6:
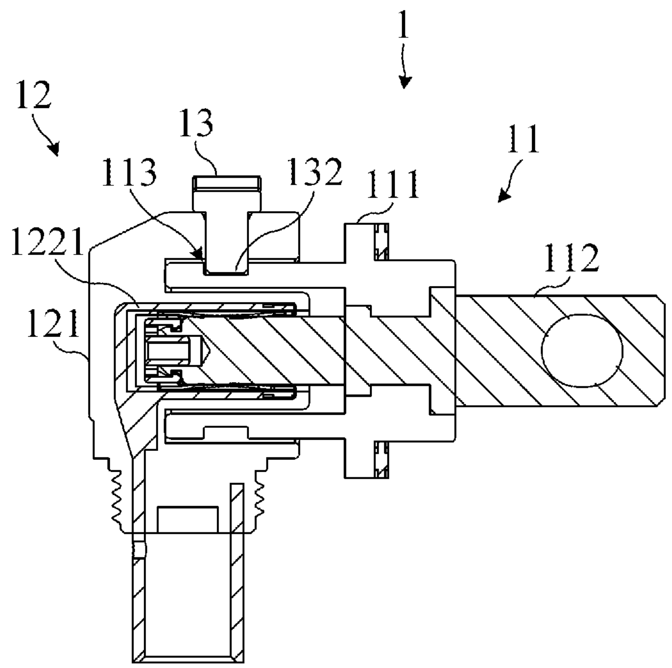
FIG. 6 is a sectional diagram illustrating the locking component of the electrical connector engaged to the fixing groove.

Please refer from FIG. 2 to FIG. 6. FIG. 5 is a sectional diagram illustrating the locking component 13 of the electrical connector 1 un-engaged to the fixing groove 113 according to an embodiment of the present invention. FIG. 6 is a sectional diagram illustrating the locking component 13 of the electrical connector 1 engaged to the fixing groove 113. In this embodiment, the locking component 13 has an embedded end 132, and the shape of the embedded end 132 is corresponding to that of the fixing groove 113 of the socket case 111. Furthermore, when the socket 11 is connected to the plug, the fixing groove 113 of the socket case 111 is corresponding to the locking hole 1212 of the plug case 121. In practice, the positions of the fixing groove 113 of the socket case 111 and the locking hole 1212 of the plug case 121 can be designed according to requirements. When the socket 11 is connected to the plug 12, the socket case 111 embeds into the containing space 1211 of the plug case 121. At this time, the fixing groove 113 disposed on the outer surface of the socket case 111 is located at the inner wall of the plug case 121 and corresponding to the locking hole 1212 of the plug case 121, so that the fixing groove 113 is exposed to the locking hole 1212.

As shown in FIG. 5 and FIG. 6, when the user fixes the plug 12 to the socket 11, the user pulls the locking component 13 in a direction away from the containing space 1211 to embed the locking structure 131 of the locking component 13 to the first locking groove 1213A of the plug case 121. At this time, the embedded end 132 of the locking component 13 is located in the locking hole 1212 and does not protrude from the containing space 1211. Then, the user inserts the plug 12 into the socket 11 along the axis direction of the first plug terminal 1221 to connect the plug 12 and the socket 11. When the socket 11 is connected to the plug 12, the user presses down the locking component 13 in a direction toward the containing space 1211 to engage the locking structure 131 of the locking component 13 to the second locking groove 1213B of the plug case 121. At this time, the embedded end 132 is protruded from the containing space 1211 and embedded in the fixing groove 113 of the socket case 111. That is to say, the locking component 13 is engaged with the socket case 111 and the plug case 121 simultaneously to fix the socket 11 and the plug 12. Because the socket 11 and the plug 12 are connected along the axis direction of the first plug terminal 1221, and the locking component 13 is moved in the direction perpendicular to the axis of the first plug terminal 1221 and engaged to the fixing groove 113 of the socket case 111, the plug 12 cannot be separated from the socket 11 because the sidewall of the embedded end 132 of the locking component 13 resists against the sidewall of the fixing groove 113 when the locking component 13 fixes the plug 12 and the socket 11. Therefore, the electrical connector of the present invention can fix the socket and the plug by the locking component in a moving manner perpendicular to the connection direction of the socket and the plug, thereby increasing the safety and efficiency of the electrical connector.

Similarly, when the user separates the plug 12 from the socket 11, the user can pull the locking component 13 in a direction away from the containing space 1211 to embed the locking structure 131 of the locking component 13 to the first locking groove 1213A of the plug case 121. At this time, the embedded end 132 of the locking component 13 is separated from the second locking groove 1213B of the plug case 121 and moves to the locking hole 1212. Then, the user pulls the plug 12 out of the socket 11 in the direction along the axis of the first plug terminal 1221 to separate the plug 12 from the socket 11.

Please refer from FIG. 1 to FIG. 3. As shown in FIG. 1 to FIG. 3, the plug case 121 further includes a sleeve structure 1214 disposed in the containing space 1211, and the sleeve structure 1214 is configured to sleeve the first plug terminal 1221. In this embodiment, the size of the sleeve structure 1214 is corresponding to that of the first plug terminal 1221, and the sleeve structure 1214 is configured on the outer surface of the first plug terminal 1221. When the socket 11 is connected to the plug 12, the socket case 111 of the socket 11 embeds into the containing space 1211 of the plug 12, and the socket case 111 is located between the plug case 121 of the plug 12 and the sleeve structure 1214. In practice, since the first plug terminal 1221 is configured between the plug case 121 and the sleeve structure 1214, the sleeve structure 1214 can avoid the socket case 111 from contacting the first plug terminal 1221 directly when the socket 11 obliquely is connected to the plug 12, so as to prevent the first plug terminal 1221 from being compressed and deformed by the socket case 111, thereby improving the installation efficiency.

In this embodiment, the plug 12 further includes a contacting terminal 124 with cylindrical shape configured in the first plug terminal 1221 along the axis 1223 of the first plug terminal 1221 and contacted the first plug terminal. Furthermore, the contacting terminal 124 has two fixed ends 1241 and an elastic portion 1242 disposed between the two fixed ends 1241. The size of the contacting terminal 124 is corresponding to that of the socket terminal 112. When the socket 11 is connected to the plug 12, the socket terminal 112 of the socket 11 inserts and contacts the contacting terminal 124, and the elastic portion 1242 of the contacting terminal 124 resists against the socket terminal 112. In practice, the material of the contacting terminal 124 may be a metal or a conductive material. When the contacting terminal 124 is disposed in the first plug terminal 1221, the two fixed ends 1241 contact the first plug terminal 1221. The elastic portion of the contacting terminal 124 may include multiple elastic plates, and the elastic plates can be bent toward the axial direction of the contacting terminal 124. When the socket 11 is connected to the plug 12, the socket terminal 112 of the socket 11 embeds into the contacting terminal 124 and stretches the elastic portion 1242 of the contacting terminal 124. At this time, the elastic portion 1242 of the contacting terminal 124 is compressed by being pressed. The compressed elastic portion 1242 will generate an elastic force to resist and contact the socket terminal 112, so that the socket terminal 112 and the first plug terminal 1221 are electrically connected. Since the elastic force generated by the elastic portion 1242 will resist the plug terminal 112, the plug 12 can clamp the socket terminal 112 of the socket 11, thereby increasing the stability.

Moreover, the socket 11 further includes a sealing gasket 114 and an insulating component 115. The sealing gasket 114 is disposed on the other side of the fixed plate 1111 relative to the cylindrical structure 1112, and the insulating component 115 is disposed on the end of the socket terminal 112 of the cylindrical structure 1112. In practice, the sealing gasket 114 is configured at the junction of the socket case 111 and the equipment component to increase the sealing and prevent foreign matter from entering the socket 11 or equipment component. The insulating component 115 can prevent the user from directly contacting the socket terminal 112, so as to avoid accidents such as electric shock, thereby improving safety.

Figure 7:
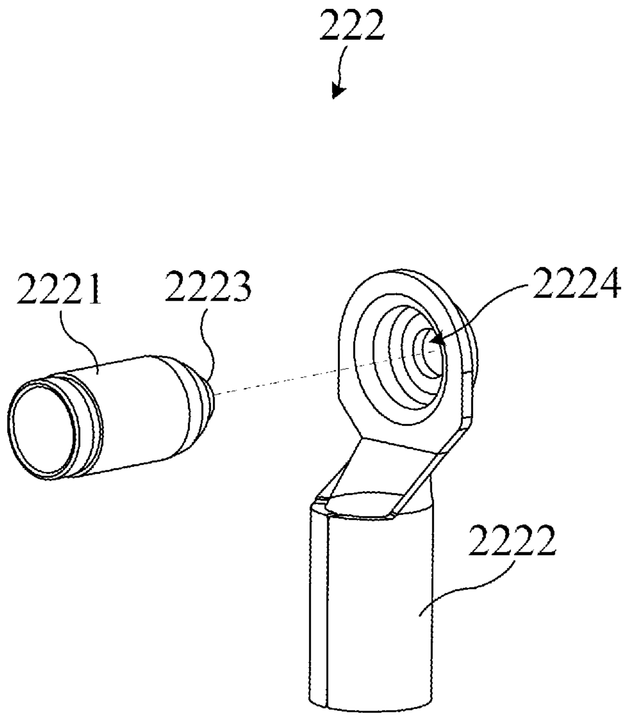
FIG. 7 is an exploded diagram illustrating the plug terminal according to an embodiment of the present invention.

In addition to the plug terminal of the plug can be integrally formed in the aforementioned embodiment, the plug terminal can also be in other types. Please refer to FIG. 7. FIG. 7 is an exploded diagram illustrating the plug terminal 222 according to an embodiment of the present invention. As shown in FIG. 7, in this embodiment, the first plug terminal 2221 includes a protruding structure 2223, and the second plug terminal 2222 includes a hole 2224. The size of the protruding structure 2223 is greater than that of the hole 2224. In practice, the protruding structure 2223 is disposed on one end of the first plug terminal 2221 connected to the second plug terminal 2222, and the hole 2224 is disposed on one end of the second plug terminal 2222 connected to the first plug terminal 2221. The protruding structure 2223 may be riveted to the hole 2224 to reliably connect the first plug terminal 2221 and the second plug terminal 2222 to form the plug terminal 222, thereby saving costs and increasing stability.

In summary, the electrical connector of the present invention can fix the socket and the plug in a moving manner perpendicular to the connection direction of the socket and the plug by the locking component, so as to improve the safety and efficiency of the electrical connector. Moreover, the electrical connector of the present invention can prevent the plug terminal from deforming due to compression during installation via the sleeve structure of the socket case, thereby improving the installation efficiency. Furthermore, the electrical connector of the present invention can clamp the socket terminal of the socket by the contacting terminal to improve the stability. In addition, the electrical connector of the present invention can produce plug terminals in different process methods to save costs and improve stability.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An electrical connector, applied for a power storage device, the electrical connector comprising:

a socket, comprising a socket case and a socket terminal, the outer surface of the socket case having a fixing groove, and the socket terminal being configured in the socket case;

a plug, matched the socket and configured to connect to the socket, the plug comprising a plug case and a plug terminal, the plug case having a containing space and a locking hole communicated with the containing space, the containing space being configured to contain the socket case of the socket, the wall of the locking hole having a first locking groove and a second locking groove arranged along the direction perpendicular to the axis, and the second locking groove being located on a side adjacent to the first plug terminal, the plug terminal comprising a first plug terminal and a second plug terminal, the first plug terminal having an axis and configured in the containing space, and the second plug terminal being vertically coupled to the first plug terminal; and a locking component, disposed in the locking hole of the plug case and configured to move in the locking hole, the locking component having a locking structure corresponding to the first locking groove and the second locking groove;

wherein, when the plug is connected to the socket, the socket terminal embeds into the first plug terminal along the axis direction, so that the socket case is located between the plug case and the first plug terminal and the fixing groove is corresponding to the locking hole, then the locking component moves perpendicularly to the axis direction to engage the locking structure in the second locking groove and engages the locking component in the fixing groove of the socket to lock the plug and the socket.

2. The electrical connector of claim 1, wherein the plug case has a sleeve structure disposed in the containing space and sleeved the first plug terminal, when the plug is connected to the socket, the socket case is located between the plug case and the sleeve structure.

3. The electrical connector of claim 1, wherein the plug comprises a back cover connected to the plug case and perpendicular to the first plug terminal, the second plug terminal is configured in the back cover.

4. The electrical connector of claim 1, wherein the first plug terminal and the second plug terminal are integrally formed.

5. The electrical connector of claim 1, wherein the first plug terminal comprises a protruding structure, and the second plug terminal comprises a hole, the size of the protruding structure is greater than that of the hole, and the protruding structure is riveted to the hole.

6. The electrical connector of claim 1, wherein the plug comprises a contacting terminal with cylindrical shape, the contacting terminal is configured in the first plug terminal along the axis direction and contacts the first plug terminal, when the socket is connected to the plug, the socket terminal of the socket contacts the contacting terminal to electrically connect to the first plug terminal.

7. The electrical connector of claim 6, wherein the contacting terminal has two fixed ends and an elastic portion located between the two fixed ends, when the socket is connected to the plug, the elastic portion resists the socket terminal of the socket with an elastic force.

8. The electrical connector of claim 1, wherein the extending direction of the locking hole and the direction of the axis of the first plug terminal are perpendicular to each other.

9. The electrical connector of claim 1, wherein the shape of the locking component is corresponding to the shape of the fixing groove of the socket.

* * * * *